United States Patent
Hosseini et al.

(10) Patent No.: US 10,536,975 B2
(45) Date of Patent: Jan. 14, 2020

(54) TECHNIQUES AND APPARATUSES FOR HANDLING COLLISIONS BETWEEN LEGACY TRANSMISSION TIME INTERVAL (TTI) COMMUNICATIONS AND SHORTENED TTI COMMUNICATIONS

(71) Applicant: QUALCOMM Incorporated, San Diego, CA (US)

(72) Inventors: Seyedkianoush Hosseini, San Diego, CA (US); Amir Farajidana, Sunnyvale, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/279,760

(22) Filed: Feb. 19, 2019

(65) Prior Publication Data
US 2019/0182867 A1    Jun. 13, 2019

Related U.S. Application Data

(63) Continuation of application No. 15/660,117, filed on Jul. 26, 2017, now Pat. No. 10,251,200.
(Continued)

(51) Int. Cl.
*H04W 4/00* (2018.01)
*H04W 74/08* (2009.01)
(Continued)

(52) U.S. Cl.
CPC ..... *H04W 74/0816* (2013.01); *H04W 52/367* (2013.01); *H04W 72/0446* (2013.01);
(Continued)

(58) Field of Classification Search
USPC .................................. 370/329, 328
See application file for complete search history.

(56) References Cited

U.S. PATENT DOCUMENTS 8,787,347 B2    7/2014 Gorokhov et al.
2012/0057476 A1    3/2012 Chan et al.
(Continued)

FOREIGN PATENT DOCUMENTS

WO    2017014048 A1    1/2017
WO    2017014558 A1    1/2017

OTHER PUBLICATIONS

Catt, "Discussion on the Simultaneous Transmissions of (s)PUCCH and (s)PUSCH," 3GPP TSG RAN WG1 Meeting #86bis, R1-1608751, Gothenburg, Sweden, Aug. 22-26, 2016, 5 pgs., XP051148807, 3rd Generation Partnership Project.
(Continued)

*Primary Examiner* — David Q Nguyen
(74) *Attorney, Agent, or Firm* — Anthony R. Morris

(57) ABSTRACT

A method, an apparatus, and a computer program product for wireless communication are provided. The apparatus may identify a potential collision between a scheduled legacy transmission time interval (TTI) communication and a scheduled shortened TTI (sTTI) communication, the legacy TTI communication having a legacy TTI duration that is longer than an sTTI duration associated with the sTTI communication. The apparatus may determine whether the legacy TTI communication is within a threshold time of being transmitted. The apparatus may transmit at least one of the sTTI communication, the legacy TTI communication, or any combination thereof, based at least in part on the determination.

30 Claims, 12 Drawing Sheets

Related U.S. Application Data

(60) Provisional application No. 62/455,506, filed on Feb. 6, 2017.

(51) Int. Cl.
| | |
|---|---|
| *H04W 72/04* | (2009.01) |
| *H04W 52/36* | (2009.01) |
| *H04L 5/00* | (2006.01) |
| *H04W 72/02* | (2009.01) |
| *H04W 72/12* | (2009.01) |

(52) U.S. Cl.
CPC ......... *H04W 72/0473* (2013.01); *H04L 5/001* (2013.01); *H04L 5/0053* (2013.01); *H04W 72/02* (2013.01); *H04W 72/0413* (2013.01); *H04W 72/1284* (2013.01)

(56) References Cited

U.S. PATENT DOCUMENTS

| | | |
|---|---|---|
| 2014/0119331 A1 | 5/2014 | Ji et al. |
| 2015/0264662 A1 | 9/2015 | Sahlin et al. |
| 2016/0150531 A1 | 5/2016 | Johansson et al. |
| 2017/0048727 A1 | 2/2017 | Cho et al. |
| 2017/0279727 A1 | 9/2017 | Kodali et al. |
| 2018/0049189 A1* | 2/2018 | Hugl ................... H04W 72/042 |
| 2018/0160440 A1 | 6/2018 | Hosseini et al. |
| 2018/0167172 A1 | 6/2018 | Hosseini et al. |
| 2018/0176909 A1* | 6/2018 | Wikstrom .......... H04W 72/0446 |
| 2018/0212732 A1* | 7/2018 | You ....................... H04L 5/0051 |
| 2018/0227955 A1 | 8/2018 | Hosseini et al. |
| 2018/0375614 A1* | 12/2018 | Shimezawa ........... H04W 72/04 |
| 2018/0375619 A1* | 12/2018 | Hwang .................... H04B 7/26 |
| 2019/0007962 A1* | 1/2019 | Arshad ............. H04W 56/0045 |
| 2019/0028162 A1* | 1/2019 | Lee ........................... H04L 5/00 |
| 2019/0045487 A1* | 2/2019 | You ....................... H04L 5/0007 |
| 2019/0068334 A1* | 2/2019 | Stern-Berkowitz ......................... H04L 1/1822 |
| 2019/0199502 A1* | 6/2019 | Wang .................. H04L 27/2602 |

OTHER PUBLICATIONS

Huawei et al., "Handling Collision Between sTTI and 1ms TTI," 3GPP Draft; R1-1608640, 3rd Generation Partnership Project (3GPP), Mobile Competence Centre; 650, Route Des Lucioles; F-06921 Sophia-antipolis Cedex; France, vol. RAN WG1, No. Lisbon, Portugal; Oct. 10, 2016-Oct. 14, 2016, Oct. 9, 2016 (Oct. 9, 2016), XP051148699, 5 Pages, Retrieved from the Internet: URL:http://www.3gpp.org/ftp/Meetings_3GPP SYNC/RAN1/DOCS/ [retrieved on Oct. 9, 2016].

Huawei et al., "UCI on sPUSCH", 3GPP Draft; R1-1608639, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), XP051148698, 7 Pages, Retrieved from the Internet: URL:http://www.3gpp.org/ftp/Meetings_3GPP SYNC/ RAN 1/Docs/ [retrieved on Oct. 9, 2016].

Huawei Hisilicon: "Handling Collision between sPUCCH/ PUCCH and PUSCH/sPUSCH", 3GPP Draft; R1-1612828, 3rd Generation Partnership Project (3GPP), Mobile Competence Centre; 650, Route Des Lucioles; F-06921 Sophia-Antipolis Cedex; France , vol. RAN WG1, No. Reno, USA; Nov. 14, 2016-Nov. 18, 2016, Nov. 13, 2016 (Nov. 13, 2016), XP051176770, 5 Pages, Retrieved from the Internet: URL:http://www.3gpp.org/ftp/Meetings_3GPPSYNC/RAN1/Docs/ [retrieved on Nov. 13, 2016].

International Search Report and Written Opinion—PCT/US2017/067595—ISA/EPO—dated Mar. 19, 2018.

* cited by examiner

TECHNIQUES AND APPARATUSES FOR HANDLING COLLISIONS BETWEEN LEGACY TRANSMISSION TIME INTERVAL (TTI) COMMUNICATIONS AND SHORTENED TTI COMMUNICATIONS

CROSS-REFERENCE TO RELATED APPLICATIONS UNDER 35 U.S.C. § 119 and 35 U.S.C. § 120

This application is a continuation of U.S. patent application Ser. No. 15/660,117, filed on Jul. 26, 2017, entitled "TECHNIQUES AND APPARATUSES FOR HANDLING COLLISIONS BETWEEN LEGACY TRANSMISSION TIME INTERVAL (TTI) COMMUNICATIONS AND SHORTENED TTI COMMUNICATIONS," which claims priority to U.S. Provisional Patent Application No. 62/455,506, filed on Feb. 6, 2017, entitled "TECHNIQUES AND APPARATUSES FOR HANDLING COLLISIONS BETWEEN LEGACY TRANSMISSION TIME INTERVAL (TTI) COMMUNICATIONS AND SHORTENED TTI COMMUNICATIONS," which are hereby expressly incorporated by reference herein.

FIELD

Aspects of the present disclosure generally relate to wireless communication, and more particularly to techniques and apparatuses for handling collisions between legacy TTI communications and shortened TTI (sTTI) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include identifying, by a user equipment (UE), a potential collision between a scheduled legacy transmission time interval (TTI) communication and a scheduled shortened TTI (sTTI) communication, the legacy TTI communication having a legacy TTI duration that is longer than an sTTI duration associated with the sTTI communication; determining, by the UE, whether the legacy TTI communication is within a threshold time of being transmitted; and transmitting, by the UE, at least one of the sTTI communication, the legacy TTI communication, or any combination thereof, based at least in part on the determination.

In some aspects, the apparatus may include a memory and at least one processor coupled to the memory. The at least one processor may be configured to identify a potential collision between a scheduled legacy transmission time interval (TTI) communication and a scheduled shortened TTI (sTTI) communication, the legacy TTI communication having a legacy TTI duration that is longer than an sTTI duration associated with the sTTI communication; determine whether the legacy TTI communication is within a threshold time of being transmitted; and transmit at least one of the sTTI communication, the legacy TTI communication, or any combination thereof, based at least in part on the determination.

In some aspects, the apparatus may include means for identifying a potential collision between a scheduled legacy transmission time interval (TTI) communication and a scheduled shortened TTI (sTTI) communication, the legacy TTI communication having a legacy TTI duration that is longer than an sTTI duration associated with the sTTI communication; means for determining whether the legacy TTI communication is within a threshold time of being transmitted; and means for transmitting at least one of the sTTI communication, the legacy TTI communication, or any combination thereof, based at least in part on the determination.

In some aspects, the computer program product may include a non-transitory computer-readable medium storing computer executable code. The code may include code for identifying a potential collision between a scheduled legacy transmission time interval (TTI) communication and a scheduled shortened TTI (sTTI) communication, the legacy TTI communication having a legacy TTI duration that is longer than an sTTI duration associated with the sTTI communication; code for determining whether the legacy TTI communication is within a threshold time of being transmitted; and code for transmitting at least one of the sTTI communication, the legacy TTI communication, or any combination thereof, based at least in part on the determination.

Aspects generally include a method, apparatus, system, computer program product, non-transitory computer-readable medium, user equipment, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
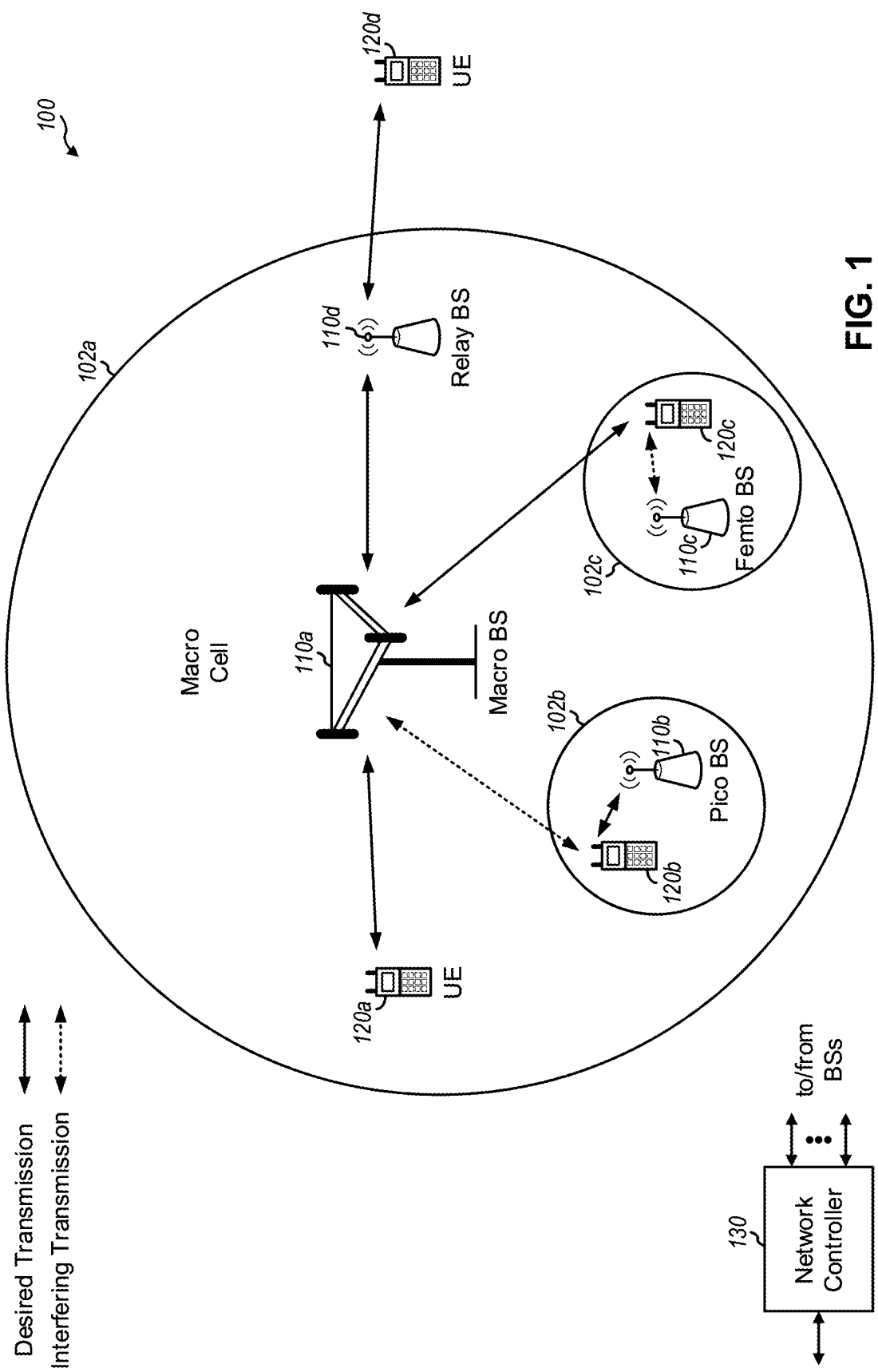
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. MTC UEs, as well as other types of UEs, may be implemented as NB-IoT (narrowband internet of things) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
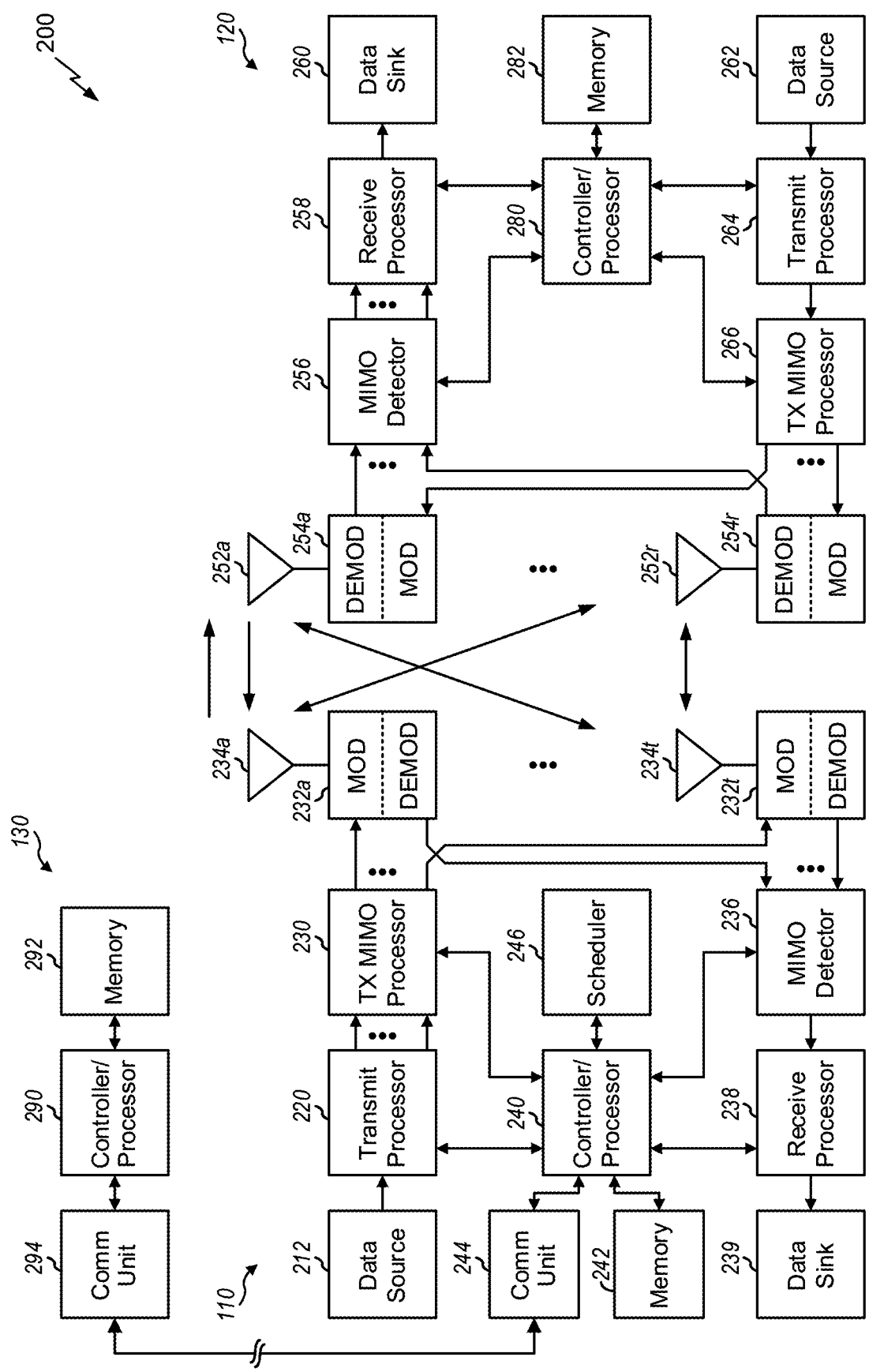
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to handle collisions between legacy TTI communications and sTTI communications. For example, controller/processor 280 and/or other processors and modules at base station 110, may perform or direct operations of UE 120 to handle collisions between legacy TTI communications and sTTI communications. For example, controller/processor 280 and/or other controllers/processors and modules at BS 110 may perform or direct operations of, for example, method 900 of FIG. 9, method 1000 of FIG. 10, method 1100 of FIG. 11, and/or other methods as described herein. In some aspects, one or more of the components shown in FIG. 2 may be employed to perform example method 900 of FIG. 9, method 1000 of FIG. 10, method 1100 of FIG. 11, and/or other methods for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
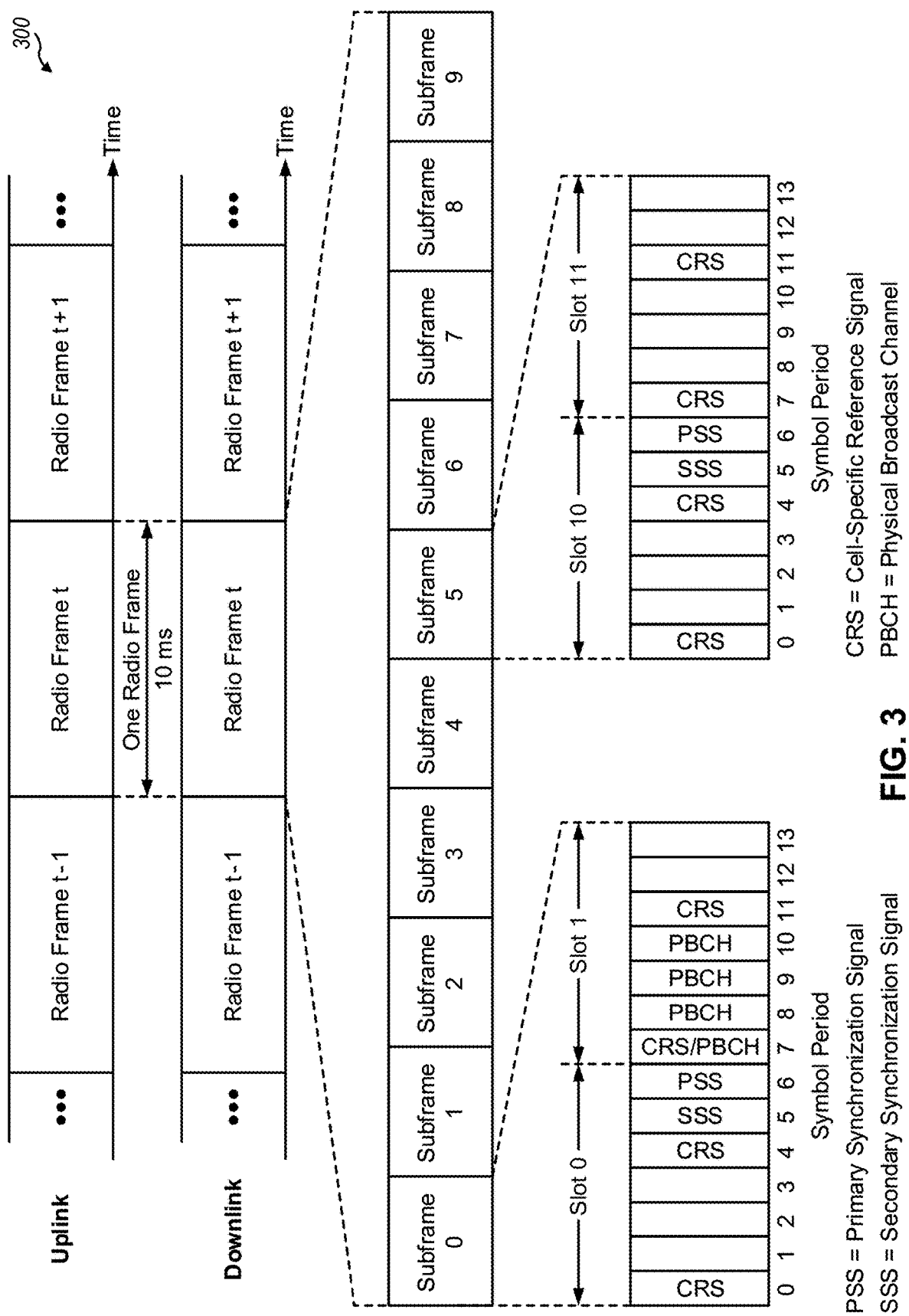
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
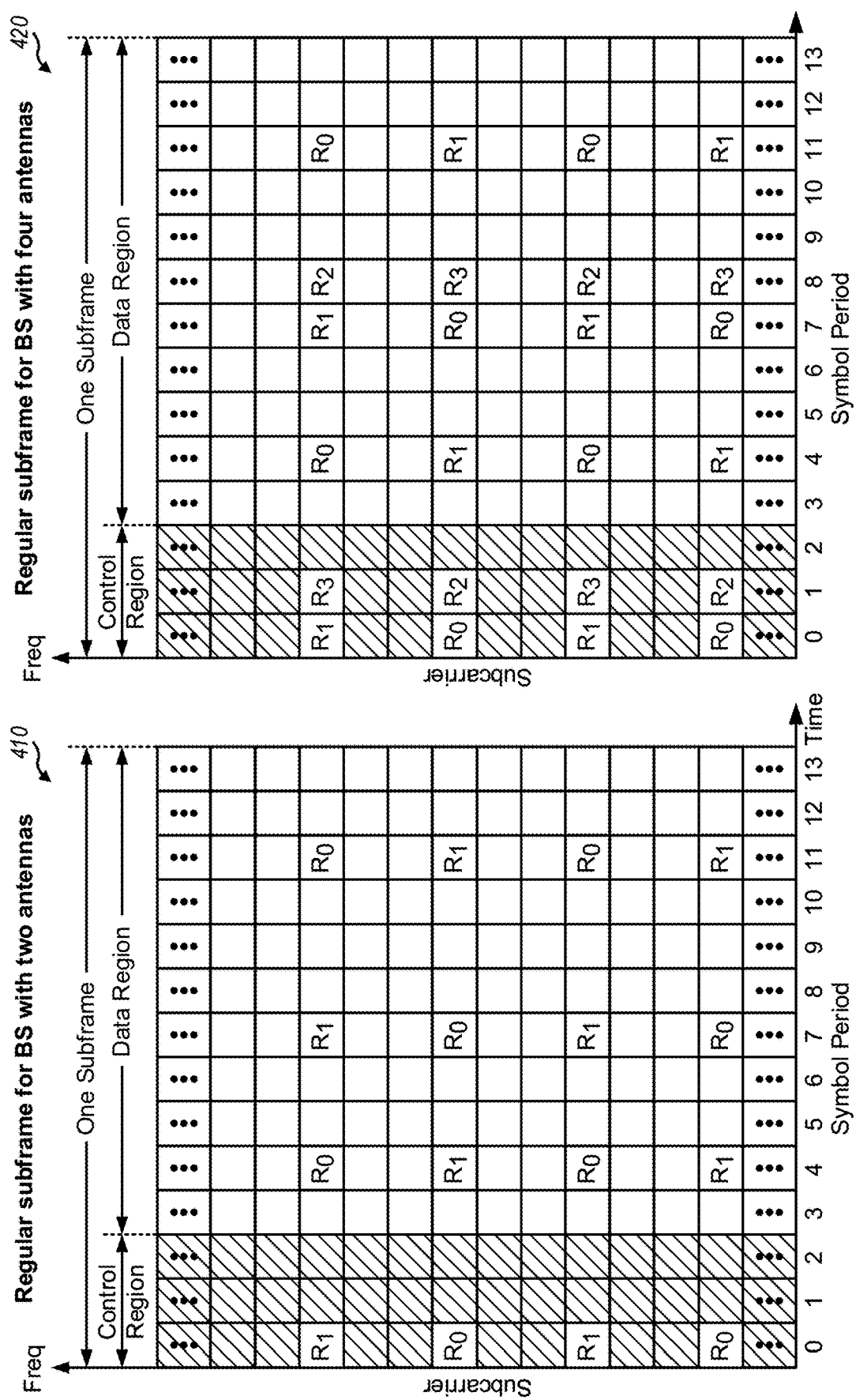
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where q∈{Q−1}.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
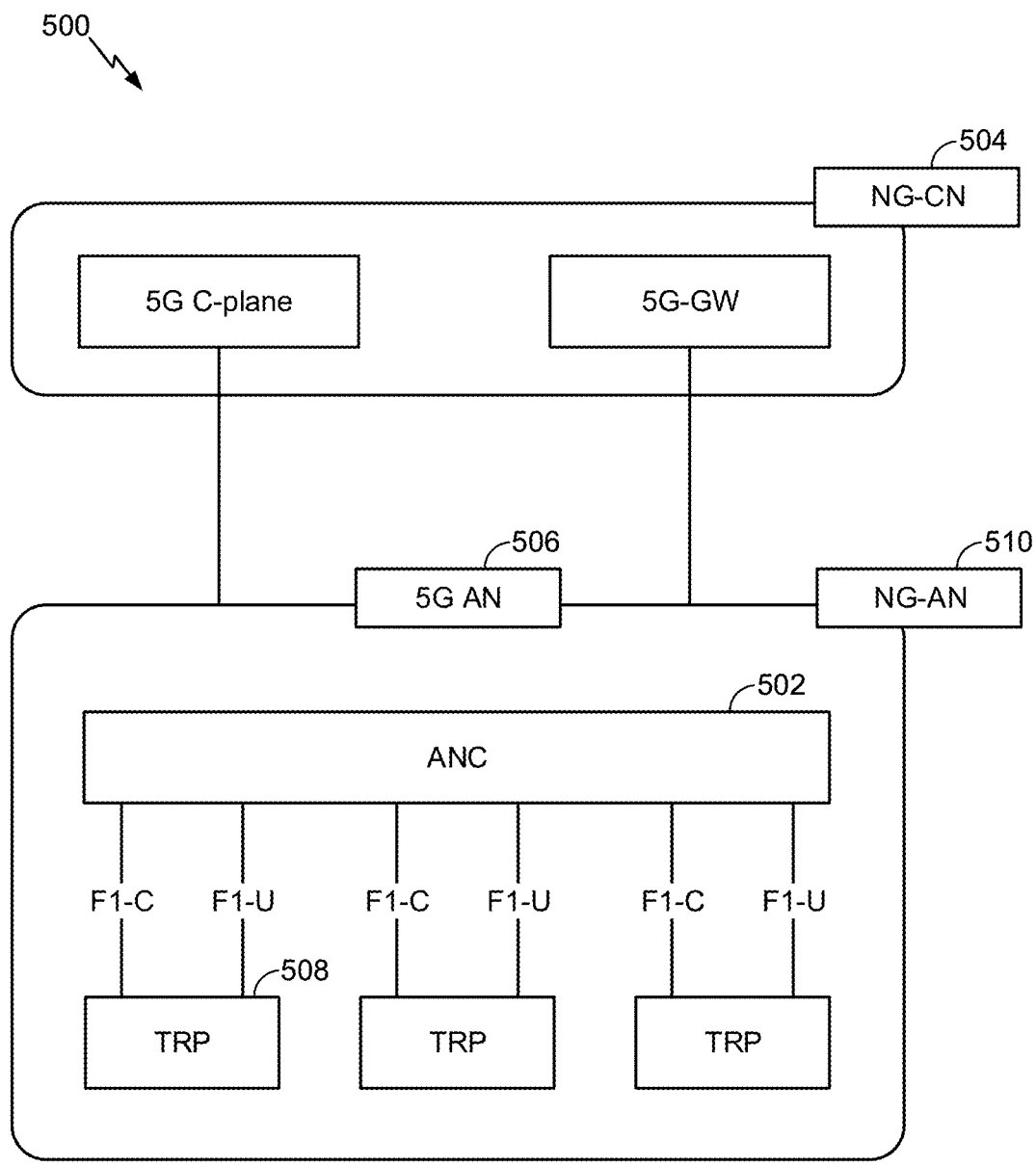
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
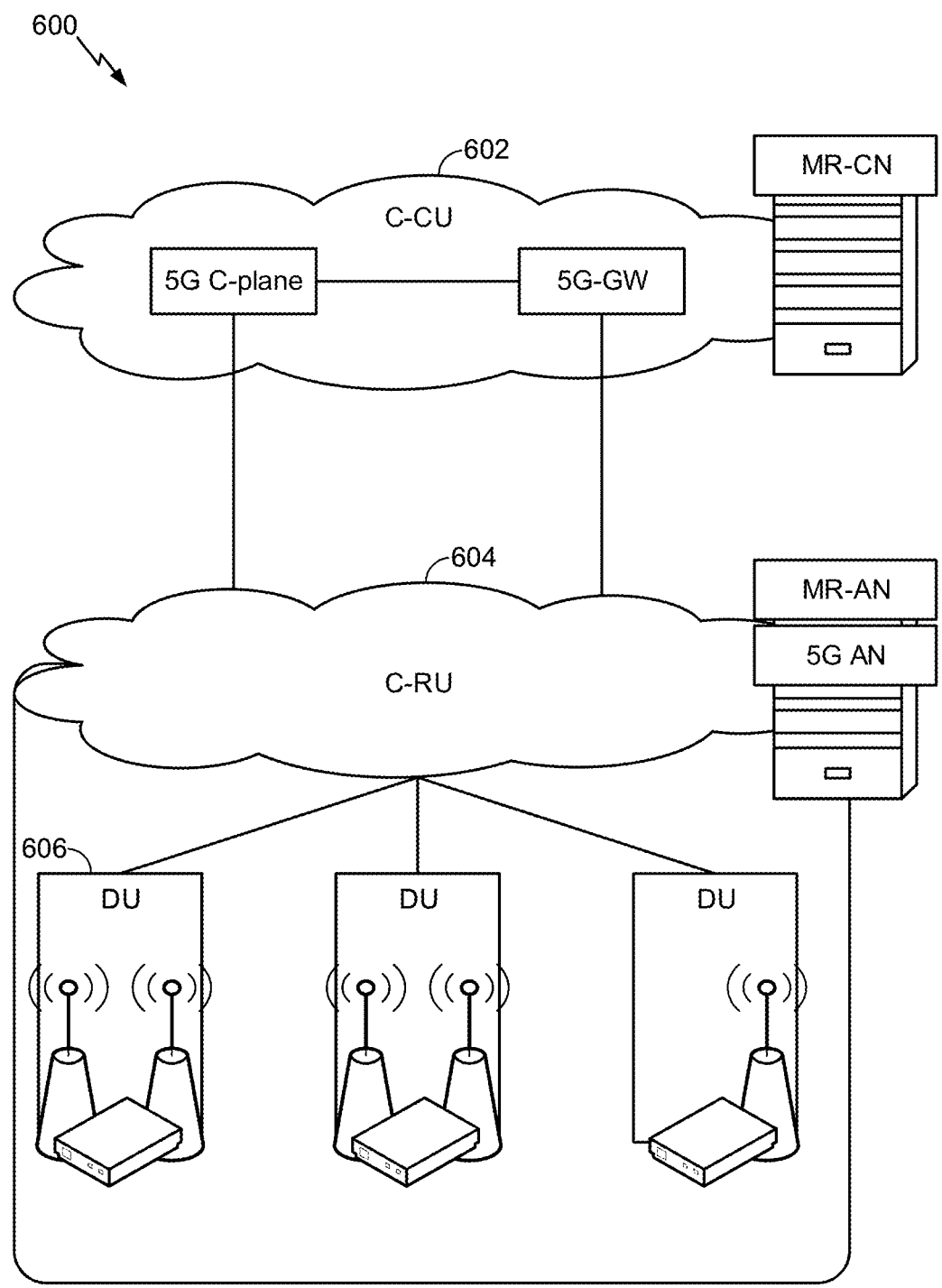
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
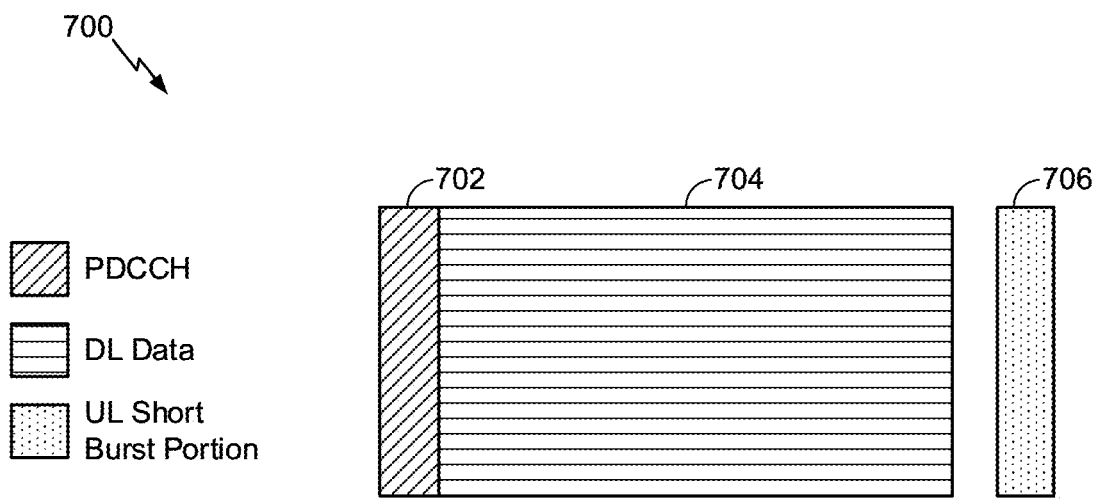
FIG. 7 is a diagram illustrating an example of a downlink (DL)-centric wireless communication structure.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
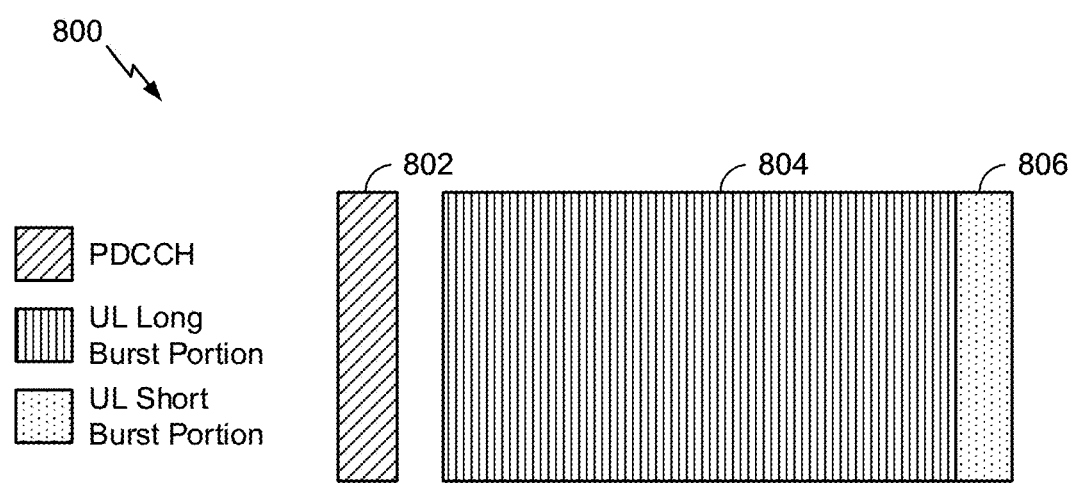
FIG. 8 is a diagram illustrating an example of an uplink (UL)-centric wireless communication structure.

FIG. 8 is a diagram 800 showing an example of an UL-centric subframe or wireless communication structure. The UL-centric subframe may include a control portion 802. The control portion 802 may exist in the initial or beginning portion of the UL-centric subframe. The control portion 802 in FIG. 8 may be similar to the control portion 702 described above with reference to FIG. 7. In some configurations, the control portion 802 may be a physical DL control channel (PDCCH).

The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

In a legacy LTE radio access technology, the transmission of PUCCH and PUSCH communications in a given legacy TTI (e.g., a 1 ms subframe) may depend on a capability of a UE. For example, if a UE is capable of performing parallel transmissions, then the UE may transmit both a control communication on the PUCCH and a data communication on the PUSCH concurrently (e.g., using power splitting). If a UE is not capable of performing parallel transmissions, then the UE may follow one or more rules to configure one or more uplink transmissions. For example, if the UE has data to be transmitted, then the UE may transmit uplink control information (UCI) on the PUSCH. If the UE does not have data to be transmitted, then the UE may transmit UCI on the PUCCH.

In a radio access technology that is capable of using shortened TTIs (sTTIs), such as New Radio, there may be instances where a combination of PUSCH communications, PUCCH communications, sPUSCH communications, and/or sPUCCH communications are to be transmitted in a same time interval (e.g., a subframe, a slot, and/or another type of wireless communication structure). Due to the different lengths of TTIs for PUSCH and/or PUCCH communications and sTTIs for sPUSCH and/or sPUSCH communications, enabling parallel transmission in these scenarios is difficult. Techniques described herein assist with configuring transmission of uplink communications when a UE identifies a potential collision between a scheduled TTI communication and a scheduled sTTI communication. In some aspects, the UE may prioritize sTTI communications due to a tighter turnaround time and stricter delay sensitivity of sTTI communications as compared to TTI communications.

Figure 9:
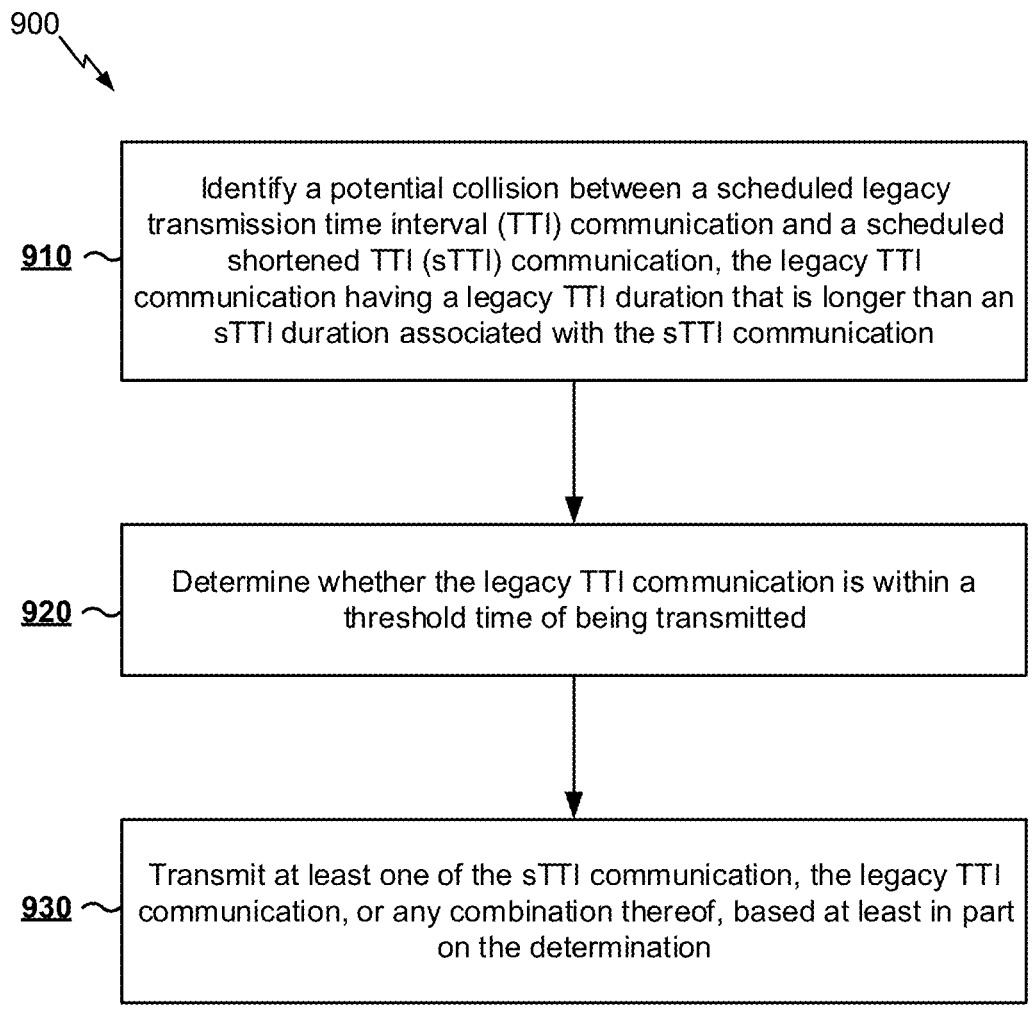
FIGS. 9-11 are flow charts of examples methods of wireless communication.

FIG. 9 is a flow chart of a method 900 of wireless communication. The method may be performed by a UE (e.g., the UE 120 of FIG. 1, the apparatus 1200/1200', and/or the like).

At 910, the UE may identify a potential collision between a scheduled legacy transmission time interval (TTI) communication and a scheduled shortened TTI (sTTI) communication, the legacy TTI communication having a legacy TTI duration that is longer than an sTTI duration associated with the sTTI communication. For example, the UE may determine that a legacy TTI communication and an sTTI communication collide when the communications overlap in time. In some aspects, the UE may receive grants for the communications, and the grants may indicate that the legacy TTI communication and the sTTI communication are to be transmitted in an overlapping time period (e.g., the same slot, subframe, etc.).

In some aspects, a TTI communication may refer to a communication with a length of 1 millisecond, a length used in LTE, and/or the like. In some aspects, this may be referred to as a legacy TTI communication. In some aspects, the legacy TTI communication is a physical uplink control channel (PUCCH) communication. In some aspects, the legacy TTI communication is a physical uplink shared channel (PUSCH) communication.

In some aspects, an sTTI communication may refer to a communication with a length that is less than 1 millisecond, that has a configurable length (e.g., of 143 microseconds, in some aspects), and/or the like. In some aspects, the sTTI communication may have a duration that is shorter than the legacy TTI communication. In some aspects, the sTTI communication is a shortened physical uplink control channel (sPUCCH) communication. In some aspects, the sTTI communication is a shortened physical uplink shared channel (sPUSCH) communication. In some aspects, the sTTI communication includes both an sPUCCH communication and an sPUSCH communication.

At 920, the UE may determine whether the legacy TTI communication is within a threshold time of being transmitted. In some aspects, the legacy TTI communication may be associated with a deadline for preparing the legacy TTI communication for transmission, and the UE may determine whether the deadline has passed. In this case, the threshold time may be greater than zero (e.g., the amount of time between the deadline for preparing the legacy TTI communication for transmission and the actual transmission). Additionally, or alternatively, the threshold time is equal to zero, which may indicate that transmission of the legacy TTI communication has begun. As used herein, determining whether the legacy TTI communication is within a threshold time of being transmitted may refer to determining whether transmission of the legacy TTI communication has already begun, determining whether a deadline in advance of the start of transmission of the legacy TTI communication has passed, and/or the like.

In some aspects, the threshold time is determined based at least in part on one or more of: a timing advance value associated with the UE, a PUCCH format (e.g., a legacy PUCCH format) of the TTI communication, or some combination thereof.

At 930, the UE may transmit at least one of the sTTI communication, the legacy TTI communication, or any combination thereof, based at least in part on the determination. In some aspects, transmitting at least one of the sTTI communication or the legacy TTI communication comprises transmitting the sTTI communication multiplexed with uplink control information from the legacy TTI communication based at least in part on determining that the legacy TTI communication is not within the threshold time of being transmitted. In this way, the UE may prioritize a delay sensitive sTTI communication, while also transmitting UCI from a legacy TTI communication, thereby increasing throughput and reducing delay.

In some aspects, transmitting at least one of the sTTI communication or the legacy TTI communication comprises transmitting the sTTI communication multiplexed with at least a portion of the legacy TTI communication based at least in part on determining that the legacy TTI communication is not within the threshold time of being transmitted. In some aspects, the portion of the legacy TTI communication is determined based at least in part on one or more of: a length of the sTTI communication, a format of the sTTI communication when the sTTI communication is a shortened physical uplink control channel (sPUCCH) communication, or some combination thereof. In some aspects, if the sPUCCH is configured to be less than or equal to a threshold size (e.g., equal to two bits), then the UE may multiplex only ACK/NACK bits of the legacy TTI communication with the sPUCCH communication (and/or the sPUSCH communication). In some aspects, if the sPUCCH is configured to be greater than or equal to a threshold size (e.g., equal to one slot), then the UE may multiplex the ACK/NACK bits and/or a channel quality indicator (CQI), precoding matrix indicator (PMI), and/or rank indicator (RI) with the sPUCCH communication (and/or the sPUSCH communication). In some aspects, transmitting at least one of the sTTI communication or the legacy TTI communication comprises transmitting only the sTTI communication (and not the legacy TTI communication) based at least in part on determining that the legacy TTI communication is not within the threshold time of being transmitted. For example, UCI from the legacy TTI communication, such as the PUCCH, may not be piggybacked or multiplexed on the sTTI communication. In this way, the UE can transmit the portion of the legacy TTI communication while prioritizing the sTTI communication, thereby increasing throughput and reducing delay.

In some aspects, transmitting at least one of the sTTI communication or the legacy TTI communication comprises transmitting the legacy TTI communication and dropping the sTTI communication based at least in part on determining that the legacy TTI communication is within the threshold time of being transmitted. In this way, the UE may conserve UE resources (e.g., processing resources, memory resources, and/or the like) by transmitting a legacy TTI communication that has already been processed (e.g., to avoid re-processing the legacy TTI communication at a later time).

In some aspects, the legacy TTI communication is a physical uplink control channel (PUCCH) communication. In some aspects, transmitting at least one of the sTTI communication or the legacy TTI communication comprises transmitting the PUCCH communication and dropping the sTTI communication based at least in part on determining that the PUCCH communication is within the threshold time of being transmitted and the PUCCH communication has a first format. In some aspects, the first format includes at least one of: format 1, format 1a, format 1b, or format 3. In some cases, puncturing a subset of PUCCH symbols when the PUCCH is format 1, format 1a, format 1b, or format 3 may cause interference across different uplink transmissions due to loss of orthogonality. Furthermore, if the PUCCH communication is ongoing (e.g., according to the deadline), then dropping the PUCCH communication may cause interference on other transmissions that are multiplexed on the same resource(s) as the PUCCH communication. Thus, in this case, the UE may not puncture the PUCCH communication, and may drop the sTTI communication, thereby reducing interference, when transmission of the PUCCH communication has already begun (e.g., according to the deadline). In some aspects, transmitting at least one of the sTTI communication or the legacy TTI communication comprises transmitting the sTTI communication and dropping one or more overlapping symbols of the PUCCH communication (e.g., symbols that overlap with the sTTI communication) and a remaining portion of the PUCCH communication (e.g., a portion for which there are not sufficient resources to transmit) based at least in part on determining that the PUCCH communication is within the threshold time of being transmitted and the PUCCH communication has the first format. In this way, the sTTI communication may be prioritized.

In some aspects, transmitting at least one of the sTTI communication or the legacy TTI communication comprises puncturing the PUCCH communication and transmitting the sTTI communication based at least in part on determining that the PUCCH communication is within the threshold time of being transmitted and the PUCCH communication has a second format. In some aspects, the second format includes at least one of: format 2, format 4, or format 5. When the PUCCH is format 2, format 4, or format 5, then puncturing a subset of the PUCCH symbols may be possible without causing interference. However, resuming transmission of the PUCCH communication after interrupting the PUCCH communication to transmit the sTTI communication may be difficult. Thus, in some aspects, the UE may puncture the PUCCH communication and may drop a remaining portion of the PUCCH communication (e.g., a portion after the time at which the PUCCH communication was punctured). In some aspects, puncturing may refer to interrupting a legacy TTI communication that has begun in order to transmit an sTTI communication. In this way, the UE may prioritize a delay sensitive sTTI communication. As described elsewhere herein, in some aspects, the sTTI communication may be multiplexed with at least a portion of the legacy TTI communication. For example, in some aspects, the sTTI communication may be multiplexed with only ACK/NACK bits of the legacy TTI communication. In some aspects, the sTTI communication may not be multiplexed with ACK/NACK bits of the legacy TTI communication. In some aspects, other UCI of the legacy TTI communication may be multiplexed with the sTTI communication, such as a CQI, PMI, and/or RI. In some aspects, the sTTI communication may not be multiplexed with other UCI of the legacy TTI communication.

In some aspects, the legacy TTI communication is a physical uplink shared channel (PUSCH) communication. In some aspects, transmitting at least one of the sTTI communication or the legacy TTI communication comprises puncturing the PUSCH communication and transmitting the sTTI communication based at least in part on determining that the PUSCH communication is within the threshold time of being transmitted. In some aspects, the UE may drop a remaining portion of the PUSCH communication (e.g., a portion after the time at which the PUSCH communication was punctured). In this way, the UE may prioritize a delay sensitive sTTI communication. In some aspects, a portion of the PUSCH communication (e.g., UCI piggybacked on the PUSCH) may be multiplexed with the sTTI communication, thereby increasing throughput and reducing delay. In some aspects, the portion of the legacy TTI communication is determined based at least in part on one or more of: a length of the sTTI communication, a format of the sTTI communication when the sTTI communication is a shortened physical uplink control channel (sPUCCH) communication, or some combination thereof, as described above.

In some aspects, the sTTI communication includes both an sPUCCH communication and an sPUSCH communication. In some aspects, transmitting at least one of the sTTI communication or the legacy TTI communication comprises transmitting the sPUCCH communication and the sPUSCH communication in parallel based at least in part on a determination that the UE is capable of transmitting parallel transmissions. In some aspects, transmitting at least one of the sTTI communication or the legacy TTI communication comprises transmitting uplink control information using the sPUSCH communication based at least in part on a determination that the UE is not capable of transmitting parallel transmissions and that the UE has data to transmit on the sPUSCH. In this way, throughput may be increased and transmission of UCI may be prioritized.

In some aspects, the UE is configured to limit a number of supported lengths of the sTTI communication on a carrier aggregation PUCCH group. For example, the UE may be configured to support only one uplink sTTI length per PUCCH group (e.g., an sTTI with a length of two symbols, an sTTI with a length of one slot, and/or the like). In this way, the UE may be capable of power splitting across multiple concurrent uplink transmissions with different TTI lengths (e.g., a legacy TTI length and a limited number of sTTI lengths, such as one). If greater than a threshold number of sTTI lengths are supported, then the UE may not be capable of concurrent transmission on legacy TTI and/or multiple sTTIs of different lengths, thereby resulting in non-transmission of information. By limiting the number of supported sTTI lengths, the UE may assure that sufficient power is available for concurrent transmissions.

In some aspects, the UE is configured to limit a number of supported lengths of the sTTI communication across multiple carrier aggregation PUCCH groups, for the reasons described above. In some aspects, the UE is configured to split transmission power across multiple carrier aggregation PUCCH groups for transmitting the at least one of the sTTI communication or the legacy TTI communication. For example, the UE may adopt a semi-static power splitting scheme if the UE supports different sTTI lengths across different PUCCH groups. In this case, the UE may semi-statically configure a maximum transmission power for each PUCCH group. In some aspects, the transmission power is split to ensure that a maximum transmission power of the UE is not exceeded. For example, the sum of the maximum transmission powers across all PUCCH groups may be less than or equal to the maximum transmission power of the UE. In this way, the UE may ensure that the maximum transmission power of the UE is not exceeded.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
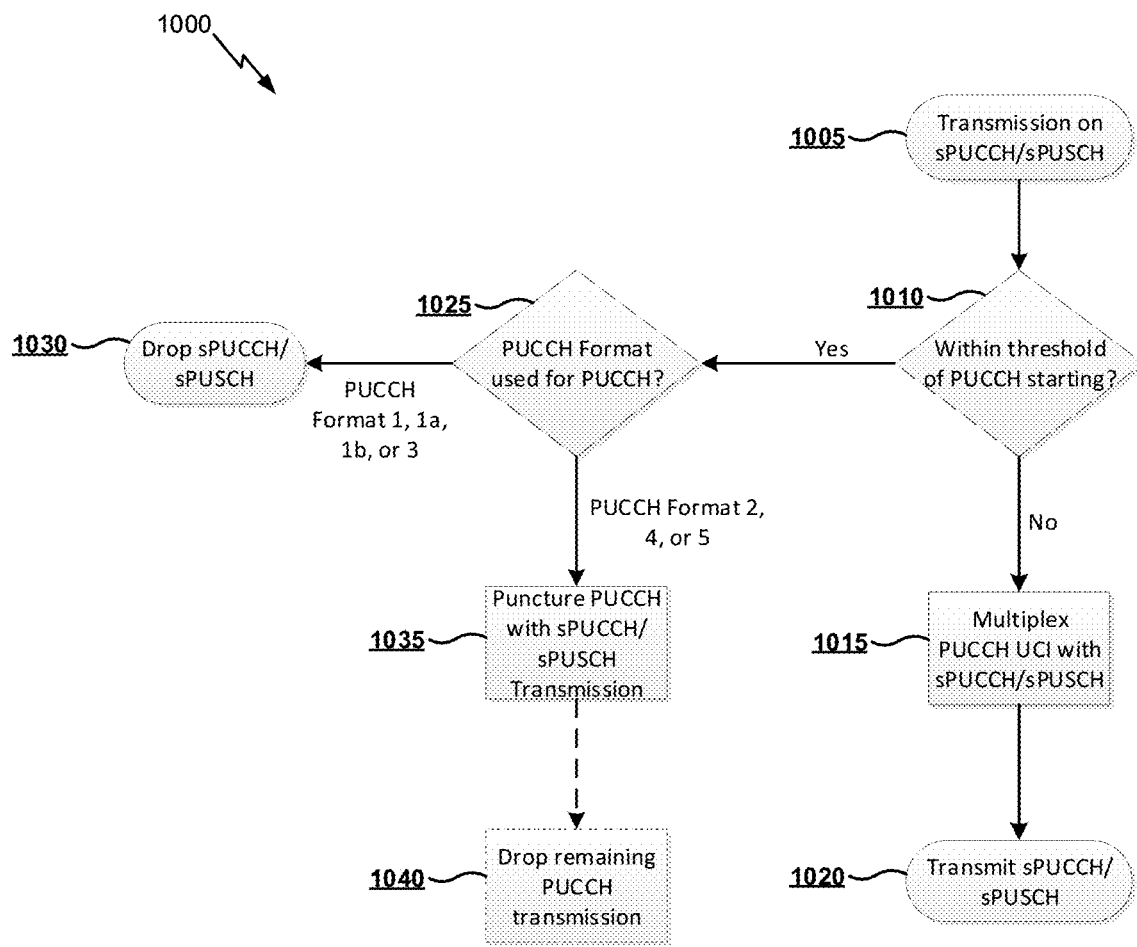

FIG. 10 is a flow chart of a method 1000 of wireless communication. The method may be performed by a UE (e.g., the UE 120 of FIG. 1, the apparatus 1200/1200', and/or the like).

At 1005, the UE may generate a transmission on a shortened physical uplink control channel (sPUCCH) and/or a shortened physical uplink shared channel (sPUSCH). In some aspects, the transmission may include uplink control information (UCI). In some aspects, the transmission may not include UCI.

At 1010, the UE may determine whether a PUCCH communication is within a threshold time of being transmitted. If the PUCCH communication is not within the threshold time of being transmitted (1010—NO), then the UE may multiplex UCI from the PUCCH communication with the sTTI communication (1015), and may transmit the multiplexed communication (1020). In some aspects, the sTTI communication may include UCI (e.g., from the sPUCCH communication and/or the sPUSCH communication). In some aspects, the UE may transmit the multiplexed communication on the sPUCCH and/or the sPUSCH.

If the PUCCH communication is within the threshold time of being transmitted (1010—YES), then the UE may determine a format of the PUCCH communication (1025). At 1030, if the format of the PUCCH communication is format 1, format 1a, format 1b, and/or format 3, then the UE may drop the sTTI communication (e.g., the sPUCCH communication and/or the sPUSCH communication).

At 1035, if the format of the PUCCH communication is format 2, format 4, or format 5, then the UE may puncture the PUCCH communication with the sTTI communication (e.g., the sPUCCH communication and/or the sPUSCH communication). Further, at 1040, the UE may drop the remaining PUCCH communication (e.g., at a point in time after the puncturing occurs).

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
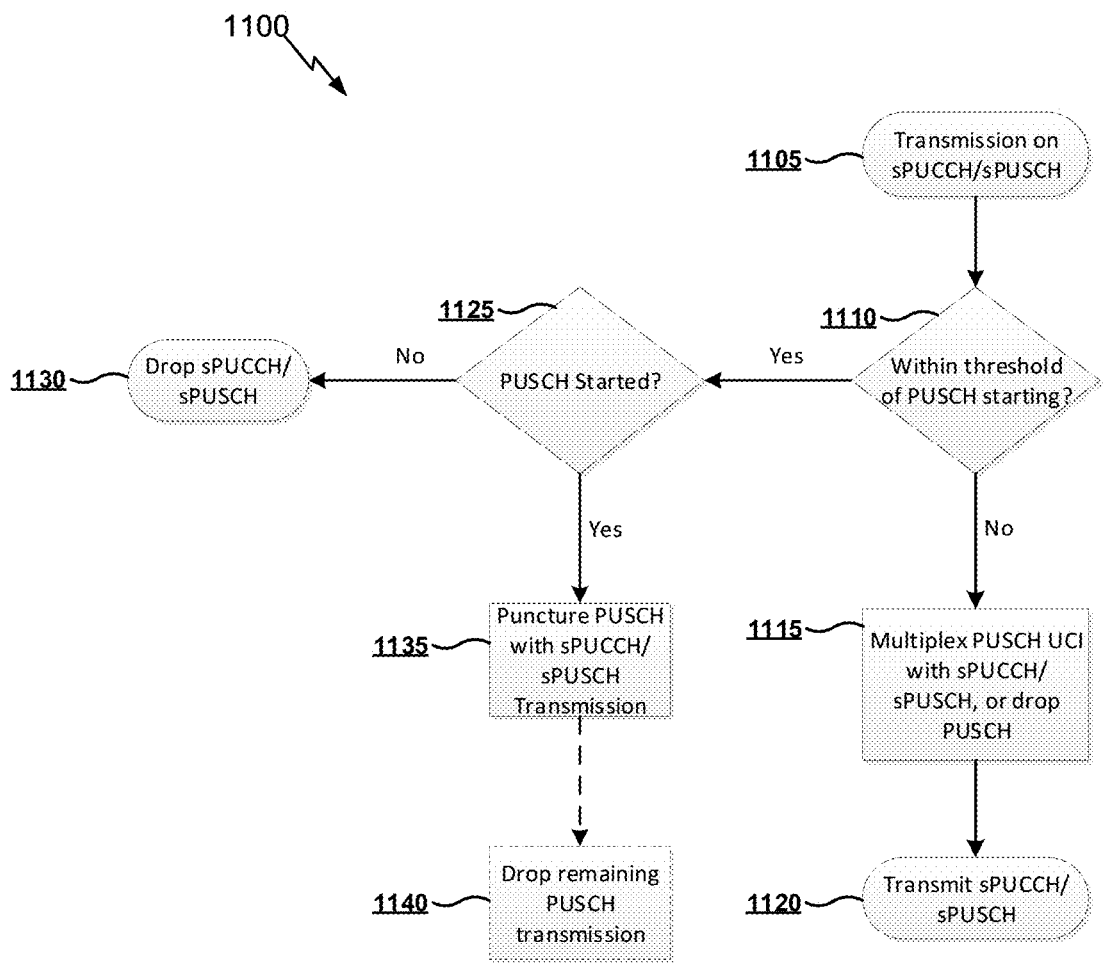

FIG. 11 is a flow chart of a method 1100 of wireless communication. The method may be performed by a UE (e.g., the UE 120 of FIG. 1, the apparatus 1200/1200', and/or the like).

At 1105, the UE may generate a transmission on a shortened physical uplink control channel (sPUCCH) and/or a shortened physical uplink shared channel (sPUSCH). In some aspects, the transmission may include UCI. In some aspects, the transmission may not include UCI.

At 1110, the UE may determine whether a PUSCH communication is within a threshold time of being transmitted. If the PUSCH communication is not within the threshold time of being transmitted (1110—NO), then the UE may multiplex UCI from the PUSCH communication (e.g., if the PUSCH communication includes UCI) with the sTTI communication or may drop the PUSCH communication (e.g., if the PUSCH communication does not include UCI) (1115), and may transmit the multiplexed communication (1120). In some aspects, the sTTI communication may include UCI (e.g., from the sPUCCH communication and/or the sPUSCH communication). In some aspects, the UE may transmit the multiplexed communication on the sPUCCH and/or the sPUSCH. In this way, the UE may prioritize transmission of the sTTI communication while increasing throughput (e.g., by multiplexing a portion of the PUSCH communication, such as UCI, with the sTTI communication)

If the PUSCH communication is within the threshold time of being transmitted (1110—YES), then the UE may determine whether transmission of the PUSCH communication has begun (1125). At 1130, if transmission of the PUSCH communication has not begun and the deadline for dropping the PUSCH communication has passed (e.g., the PUSCH communication is within the threshold time of being transmitted), then the UE may drop the sTTI communication (e.g., the sPUCCH communication and/or the sPUSCH communication). In this way, the UE may conserve UE resources (e.g., processing resources, memory resources, and/or the like) by transmitting a legacy TTI communication that has already been processed and/or begun transmission (e.g., to avoid re-processing and/or re-transmitting the legacy TTI communication at a later time).

At 1135, if transmission of the PUSCH communication has begun, then the UE may puncture the PUSCH communication with the sTTI communication (e.g., the sPUCCH communication and/or the sPUSCH communication). Further, at 1140, the UE may drop the remaining PUSCH communication (e.g., at a point in time after the puncturing occurs). In this way, the UE may prioritize a delay sensitive sTTI communication.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
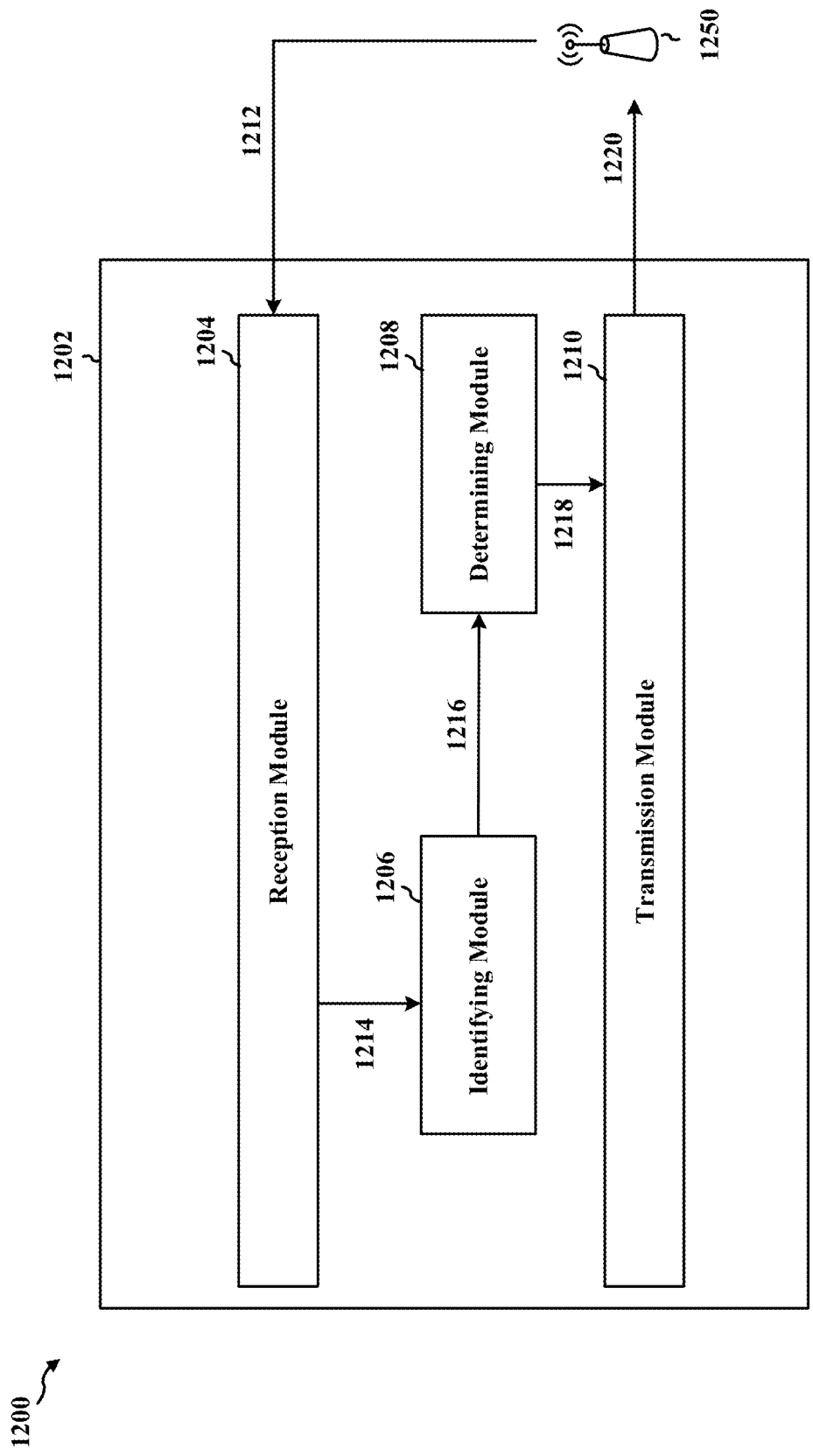
FIG. 12 is a conceptual data flow diagram illustrating the data flow between different modules/means/components in an example apparatus.

FIG. 12 is a conceptual data flow diagram 1200 illustrating the data flow between different modules/means/components in an example apparatus 1202. The apparatus 1202 may be a UE, such as one or more of the UEs described herein. In some aspects, the apparatus 1202 includes a reception module 1204, an identifying module 1206, a determining module 1208, and/or a transmission module 1210.

The reception module 1204 may receive data 1212 from an eNB 1250, such as one or more uplink grants and/or downlink grants for legacy TTI communications and/or sTTI communications. The reception module 1204 may provide such data, as data 1214, to the identifying module 1206. The identifying module 1206 may identify a potential collision between a scheduled legacy TTI communication and a scheduled sTTI communication, and may provide data 1216 regarding the potential collision to the determining module 1208. The determining module 1208 may determine whether the legacy TTI communication is within a threshold time of being transmitted, and may provide data 1218 regarding this determination to the transmission module 1210. The transmission module 1210 may transmit, as data 1220, at least one of the sTTI communication, the legacy TTI communication, or any combination thereof, based at least in part on the data 1220.

The apparatus may include additional modules that perform each of the blocks of the algorithm in the aforementioned flow charts of FIGS. 9, 10, and/or 11. As such, each block in the aforementioned flow charts of FIGS. 9, 10, and/or 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
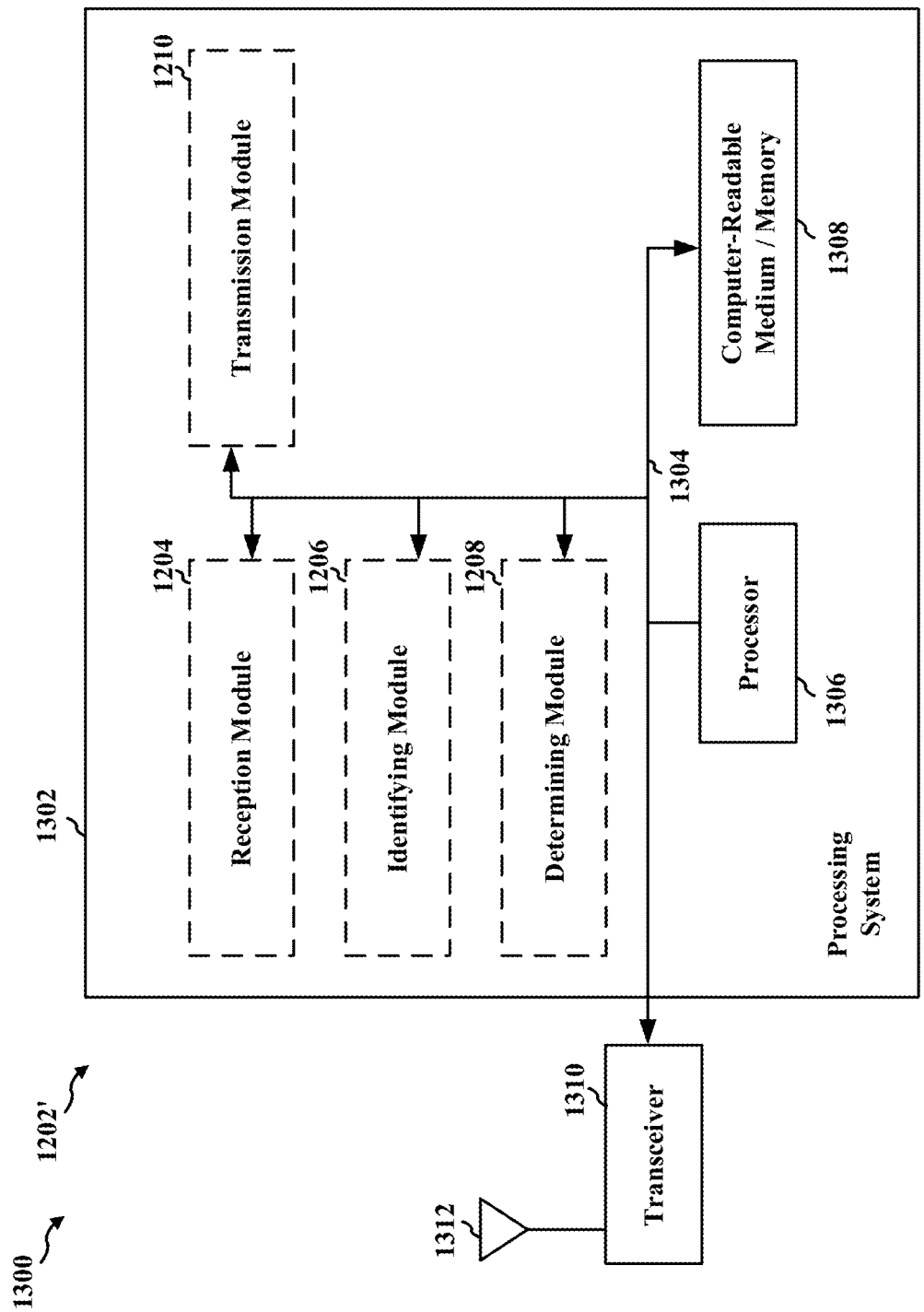
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a UE, such as one or more UEs described elsewhere herein.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and/or 1210, and the computer-readable medium/memory 1308. The bus 1304 may also link various other circuits such as timing sources, peripherals, voltage regulators, and power management circuits, which are well known in the art, and therefore, will not be described any further.

The processing system 1302 may be coupled to a transceiver 1310. The transceiver 1310 is coupled to one or more antennas 1312. The transceiver 1310 provides a means for communicating with various other apparatus over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1210, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described supra for any particular apparatus. The computer-readable medium/memory 1308 may also be used for storing data that is manipulated by the processor 1306 when executing software. The processing system further includes at least one of the modules 1204, 1206, 1208, and/or 1210. The modules may be software modules running in the processor 1306, resident/stored in the computer readable medium/memory 1308, one or more hardware modules coupled to the processor 1306, or some combination thereof. The processing system 1302 may be a component of the UE 120 and may include the memory 282 and/or at least one of the TX MIMO processor 266, the RX processor 258, and/or the controller/processor 280.

In some aspects, the apparatus 1202/1202' for wireless communication includes means for identifying a potential collision between a scheduled legacy transmission time interval (TTI) communication and a scheduled shortened TTI (sTTI) communication, means for determining whether the legacy TTI communication is within a threshold time of being transmitted, means for transmitting at least one of the sTTI communication, the legacy TTI communication, or any combination thereof, based at least in part on the determination, and/or the like. The aforementioned means may be one or more of the aforementioned modules of the apparatus 1202 and/or the processing system 1302 of the apparatus 1202' configured to perform the functions recited by the aforementioned means. As described supra, the processing system 1302 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 13 is provided as an example. Other examples are possible and may differ from what was described in connection with FIG. 13.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
identifying, by a user equipment (UE), a potential collision between a scheduled legacy transmission time interval (TTI) communication and a scheduled shortened TTI (sTTI) communication, the legacy TTI communication having a legacy TTI duration that is longer than asTTI duration associated with the sTTI communication;
determining, by the UE, whether the legacy TTI communication is within a threshold time of being transmitted; and
transmitting, by the UE, at least one of the sTTI communication or the legacy TTI communication based at least in part on the determination,
wherein the UE is configured to limit a number of supported lengths of the sTTI communication to less than a threshold number of supported lengths on at least one of:
a carrier aggregation physical uplink control channel (PUCCH) group,
multiple carrier aggregation PUCCH groups, or
some combination thereof, and
wherein the threshold number of supported lengths is set to permit power splitting, by the UE, across multiple concurrent uplink transmissions with different TTI lengths.

2. The method of claim 1, wherein transmitting at least one of the sTTI communication or the legacy TTI communication comprises transmitting the sTTI communication multiplexed with uplink control information from the legacy TTI communication based at least in part on determining that the legacy TTI communication is not within the threshold time of being transmitted.

3. The method of claim 1, wherein transmitting at least one of the sTTI communication or the legacy TTI communication comprises transmitting the sTTI communication multiplexed with at least a portion of the legacy TTI communication based at least in part on determining that the legacy TTI communication is not within the threshold time of being transmitted.

4. The method of claim 3, wherein the portion of the legacy TTI communication is determined based at least in part on one or more of:
a length of the sTTI communication,
a format of the sTTI communication when the sTTI communication is a shortened physical uplink control channel (sPUCCH) communication, or
some combination thereof.

5. The method of claim 1, wherein the threshold time is determined based at least in part on one or more of:
a timing advance value associated with the UE,
a PUCCH format of the TTI communication, or
some combination thereof.

6. An apparatus for wireless communication, comprising:
a memory; and
at least one processor coupled to the memory and configured to:
identify a potential collision between a scheduled legacy transmission time interval (TTI) communication and a scheduled shortened TTI (sTTI) communication, the legacy TTI communication having a legacy TTI duration that is longer than a sTTI duration associated with the sTTI communication;
determine whether the legacy TTI communication is within a threshold time of being transmitted; and
transmit at least one of the sTTI communication or the legacy TTI communication based at least in part on the determination,
wherein the at least one processor is configured to limit a number of supported lengths of the sTTI communication to less than a threshold number of supported lengths on at least one of:
a carrier aggregation physical uplink control channel (PUCCH) group,
multiple carrier aggregation PUCCH groups, or
some combination thereof, and
wherein the threshold number of supported lengths is set to permit power splitting, by the UE, across multiple concurrent uplink transmissions with different TTI lengths.

7. The apparatus of claim 6, wherein the at least one processor, when transmitting at least one of the sTTI communication or the legacy TTI communication, is configured to transmit the legacy TTI communication and drop the sTTI communication based at least in part on determining that the legacy TTI communication is within the threshold time of being transmitted.

8. The apparatus of claim 6, wherein the legacy TTI communication is a PUCCH communication; and
wherein the at least one processor, when transmitting at least one of the sTTI communication or the legacy TTI communication, is configured to transmit the PUCCH communication and drop the sTTI communication based at least in part on determining that the PUCCH communication is within the threshold time of being transmitted and the PUCCH communication has a first format.

9. The apparatus of claim 8, wherein the first format includes at least one of:
format 1,
format 1a,
format 1b, or
format 3.

10. The apparatus of claim 6, wherein the legacy TTI communication is a PUCCH communication; and
wherein the at least one processor, when transmitting at least one of the sTTI communication or the legacy TTI communication, is configured to transmit the sTTI communication and drop one or more overlapping symbols of the PUCCH communication and a remaining portion of the PUCCH communication based at least in part on determining that the PUCCH communication is within the threshold time of being transmitted and the PUCCH communication has a first format.

11. The apparatus of claim 6, wherein the sTTI communication includes both a shortened physical uplink control channel (sPUCCH) communication and a shortened physical uplink shared channel (sPUSCH) communication.

12. The apparatus of claim 6, wherein the at least one processor, when transmitting at least one of the sTTI communication or the legacy TTI communication, is to:
transmit the sTTI communication multiplexed with at least a portion of the legacy TTI communication when the legacy TTI communication is determined not to be within the threshold time of being transmitted.

13. The apparatus of claim 12, wherein the portion of the legacy TTI communication including at least one of:
   ACK/NACK bits of the legacy TTI communication,
   a channel quality indicator (CQI) of the legacy TTI communication,
   a precoding matrix indicator (PMI) of the legacy TTI communication, or
   a rank indicator (RI) of the legacy TTI communication.

14. An apparatus for wireless communication, comprising:
   means for identifying, by a user equipment (UE), a potential collision between a scheduled legacy transmission time interval (TTI) communication and a scheduled shortened TTI (sTTI) communication, the legacy TTI communication having a legacy TTI duration that is longer than asTTI duration associated with the sTTI communication;
   means for determining, by the UE, whether the legacy TTI communication is within a threshold time of being transmitted; and
   means for transmitting, by the UE, at least one of the sTTI communication or the legacy TTI communication based at least in part on the determination,
      wherein the UE is configured to limit a number of supported lengths of the sTTI communication to less than a threshold number of supported lengths on at least one of:
         a carrier aggregation physical uplink control channel (PUCCH) group,
         multiple carrier aggregation PUCCH groups, or
         some combination thereof, and
      wherein the threshold number of supported lengths is set to permit power splitting, by the UE, across multiple concurrent uplink transmissions with different TTI lengths.

15. The apparatus of claim 14, wherein the means for transmitting at least one of the sTTI communication or the legacy TTI communication comprises:
   means for transmitting the sTTI communication multiplexed with uplink control information from the legacy TTI communication based at least in part on determining that the legacy TTI communication is not within the threshold time of being transmitted.

16. The apparatus of claim 14, wherein the means for transmitting at least one of the sTTI communication or the legacy TTI communication comprises:
   means for transmitting the sTTI communication multiplexed with at least a portion of the legacy TTI communication based at least in part on determining that the legacy TTI communication is not within the threshold time of being transmitted.

17. The apparatus of claim 16, wherein the portion of the legacy TTI communication is determined based at least in part on one or more of:
   a length of the sTTI communication,
   a format of the sTTI communication when the sTTI communication is a shortened physical uplink control channel (sPUCCH) communication, or
   some combination thereof.

18. The apparatus of claim 16, the portion of the legacy TTI communication including at least one of:
   ACK/NACK bits of the legacy TTI communication,
   a channel quality indicator (CQI) of the legacy TTI communication,
   a precoding matrix indicator (PMI) of the legacy TTI communication, or
   a rank indicator (RI) of the legacy TTI communication.

19. The apparatus of claim 14, wherein the threshold time is determined based at least in part on one or more of:
   a timing advance value associated with the UE,
   a PUCCH format of the TTI communication, or
   some combination thereof.

20. The apparatus of claim 14, wherein the sTTI communication includes both a shortened physical uplink control channel (sPUCCH) communication and a shortened physical uplink shared channel (sPUSCH) communication.

21. A non-transitory computer-readable medium storing computer executable code for wireless communication, comprising code for:
   identifying a potential collision between a scheduled legacy transmission time interval (TTI) communication and a scheduled shortened TTI (sTTI) communication, the legacy TTI communication having a legacy TTI duration that is longer than a sTTI duration associated with the sTTI communication;
   determining whether the legacy TTI communication is within a threshold time of being transmitted; and
   transmitting at least one of the sTTI communication or the legacy TTI communication based at least in part on the determination,
      wherein a number of supported lengths of the sTTI communication is limited to less than a threshold number of supported lengths on at least one of:
         a carrier aggregation physical uplink control channel (PUCCH) group,
         multiple carrier aggregation PUCCH groups, or
         some combination thereof, and
      wherein the threshold number of supported lengths is set to permit power splitting, by the UE, across multiple concurrent uplink transmissions with different TTI lengths.

22. The non-transitory computer-readable medium of claim 21, wherein transmitting at least one of the sTTI communication or the legacy TTI communication includes transmitting the legacy TTI communication and dropping the sTTI communication based at least in part on determining that the legacy TTI communication is within the threshold time of being transmitted.

23. The non-transitory computer-readable medium of claim 21, wherein the legacy TTI communication is a PUCCH communication; and
   wherein transmitting at least one of the sTTI communication or the legacy TTI communication includes transmitting the PUCCH communication and dropping the sTTI communication based at least in part on determining that the PUCCH communication is within the threshold time of being transmitted and the PUCCH communication has a first format.

24. The non-transitory computer-readable medium of claim 23, wherein the first format includes at least one of:
   format 1,
   format 1a,
   format 1b, or
   format 3.

25. The non-transitory computer-readable medium of claim 21, wherein the legacy TTI communication is a PUCCH communication; and
   wherein transmitting at least one of the sTTI communication or the legacy TTI communication includes transmitting the sTTI communication and dropping one or more overlapping symbols of the PUCCH communication and a remaining portion of the PUCCH communication based at least in part on determining that the PUCCH communication is within the threshold time of being transmitted and the PUCCH communication has a first format.

26. The non-transitory computer-readable medium of claim 21, wherein the sTTI communication includes both a shortened physical uplink control channel (sPUCCH) communication and a shortened physical uplink shared channel (sPUSCH) communication.

27. The non-transitory computer-readable medium of claim 21, wherein transmitting at least one of the sTTI communication or the legacy TTI communication includes transmitting the sTTI communication multiplexed with at least a portion of the legacy TTI communication when the legacy TTI communication is determined not to be within the threshold time of being transmitted.

28. The non-transitory computer-readable medium of claim 27, wherein the portion of the legacy TTI communication including at least one of:
  ACK/NACK bits of the legacy TTI communication,
  a channel quality indicator (CQI) of the legacy TTI communication,
  a precoding matrix indicator (PMI) of the legacy TTI communication, or
  a rank indicator (RI) of the legacy TTI communication.

29. The non-transitory computer-readable medium of claim 21, wherein the legacy TTI communication is a PUCCH communication; and
  transmitting at least one of the sTTI communication or the legacy TTI communication includes transmitting the PUCCH communication and dropping the sTTI communication based at least in part on determining that the PUCCH communication is within the threshold time of being transmitted and the PUCCH communication has a first format.

30. The non-transitory computer-readable medium of claim 29, wherein the first format includes at least one of:
  format 1,
  format 1a,
  format 1b, or
  format 3.

* * * * *